US008887991B2

(12) United States Patent
Htay et al.

(10) Patent No.: US 8,887,991 B2
(45) Date of Patent: Nov. 18, 2014

(54) METHOD AND APPARATUS FOR CONFIGURING AND VALIDATING TELECOM AND DATACOM SYSTEMS

(71) Applicants: Aung Htay, Alpharetta, GA (US); Cheol Woo Jung, Alpharetta, GA (US)

(72) Inventors: Aung Htay, Alpharetta, GA (US); Cheol Woo Jung, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 83 days.

(21) Appl. No.: 13/727,734

(22) Filed: Dec. 27, 2012

(65) Prior Publication Data

US 2014/0183254 A1 Jul. 3, 2014

(51) Int. Cl.
*G06K 5/00* (2006.01)
(52) U.S. Cl.
CPC ......................................... *G06K 5/00* (2013.01)
USPC .................................... 235/375; 235/462.01
(58) Field of Classification Search
USPC ............................................ 235/375, 462.01
See application file for complete search history.

(56) References Cited

U.S. PATENT DOCUMENTS

| 7,229,020 B2* | 6/2007 | Goodison et al. ......... 235/462.01 |
| 7,468,669 B1* | 12/2008 | Beck et al. .................. 340/572.1 |
| 2011/0025876 A1* | 2/2011 | Denzler et al. ............. 348/222.1 |
| 2014/0023326 A1* | 1/2014 | Anderson et al. ............... 385/78 |
| 2014/0111346 A1* | 4/2014 | Pinn et al. .................. 340/691.6 |

* cited by examiner

*Primary Examiner* — Daniel Hess
(74) *Attorney, Agent, or Firm* — Clements Bernard PLLC; Christopher L. Bernard; Lawrence A. Baratta, Jr.

(57) ABSTRACT

A mobile-device method and system implement validating installation of a network device, for example the installation and validation of cards within a network element. Installation data is loaded onto the mobile device and one or more cards are installed in a network element, the cards having QR codes. An image of the installation is captured and the QR codes are recognized in the captured image. The cards are identified by association with the recognized markers and the physical locations, such as slot positions, of the cards relative to the network element are determined. The installation is validated with regard to slot assignments of cards and an installation report is uploaded from the mobile device to central servers.

27 Claims, 11 Drawing Sheets

METHOD AND APPARATUS FOR CONFIGURING AND VALIDATING TELECOM AND DATACOM SYSTEMS

FIELD OF THE INVENTION

Generally, the field of art of the present disclosure pertains to network systems and methods, and more particularly, to methods and systems for installing, configuring, and validating network devices.

BACKGROUND OF THE INVENTION

Various telecommunication and data communication platforms are deployed in various central offices, points-of-presence, wiring cabinets, huts, and the like as network elements that each include a variety of different line cards, line modules, blades, processors, etc. For example, optical platforms are being developed for use across optical networks to provide connectivity such as 40 G/100 G coherent ultra-long haul (ULH) dense wavelength division multiplexing (DWDM). A single platform can provide a shelf of slots into which cards are to be inserted for wireless backhaul, data center connectivity, or business services delivery. An optical platform can act as an optical transit node with multi-way branching with 40 G/100 G wavelength transport. Because such platforms are highly flexible, their configurations will vary according to location, operator, and contemporary needs.

Equipment installation, configuration, and verification currently are time-consuming processes. Before installation of a network element and associated cards can be declared complete, an installation technician typically must contact network management personnel while still physically at the equipment location. The network management personnel typically logs into their operation systems to check the status of the installed equipment. If the status of the equipment is pending, the installation technician has to resolve the problem in the field so that the equipment status is updated and equipped. These processes are time-consuming in terms of man-hours as well as expensive. Further, conventional processes often require repeated site visits which is costly as well as time consuming.

BRIEF SUMMARY OF THE INVENTION

In various exemplary embodiments, a mobile-device implemented method of validating installation of a card within a network device is provided. The method includes capturing an image in which at least one card is installed in a network device, the card having a marker thereon; recognizing the marker within the captured image; identifying the card by association with the recognized marker; determining a physical position of the card in the network device according to the captured image; and validating the determined physical position.

In another exemplary embodiment, a system includes a network device having multiple slots; a card inserted into a particular one of the multiple slots; a marker disposed on the card; and a mobile device comprising a non-transitory memory storing instructions which, when executed by the mobile device, cause the mobile device to: capture an image; recognize the marker within the captured image; determine the physical position of the card relative to the network device according to the captured image; and validate the determined physical position.

In yet another exemplary embodiment, a non-transitory memory stores instructions which, when executed by a mobile device, cause the mobile device to: capture an image; recognize a marker within the captured image; determine the physical position of a card relative to a network device according to the captured image; and validate the determined physical position.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, mobile-device methods and systems implement installation and validation of cards within a network device are described. Network device installation data is loaded onto the mobile device and one or more cards are installed in a network device, the cards having QR codes. An image of the installation is captured and the QR codes are recognized in the captured image. The cards are identified by association with the recognized markers and the physical locations, such as slot positions, of the cards within the network device are determined. The installation is validated with regard to slot assignments of cards and an installation report is uploaded from the mobile device to central servers. Advantageously, the mobile-device systems and methods ensure proper installation through the validation before a technician leaves a site.

Figure 1:
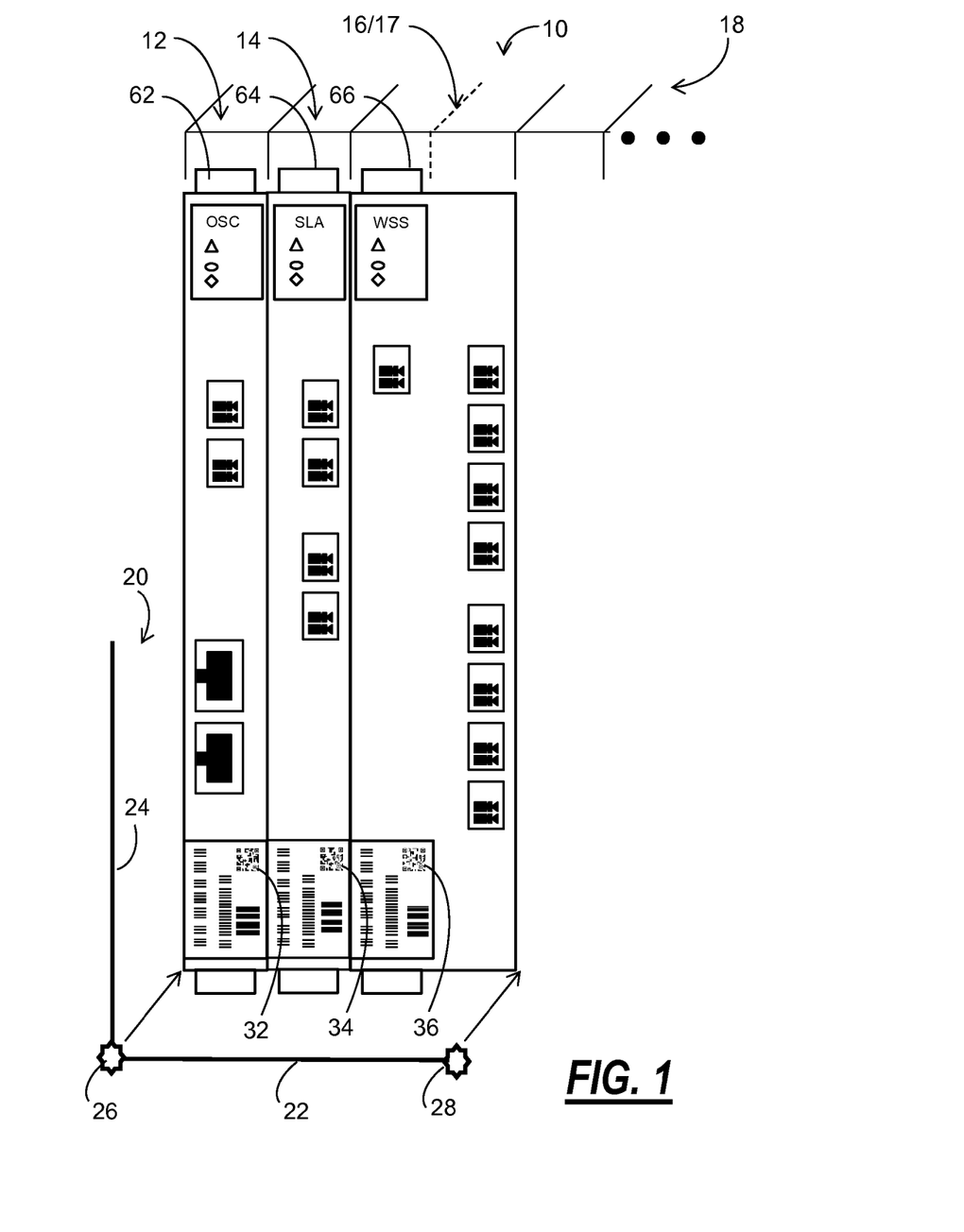
FIG. 1 is a pictorial representation of several cards installed in a network element.

FIG. 1 illustrates a network element 10 with a shelf 18 having slots 12, 14, 16 and 17 in which cards 62, 64 and 66 are installed. For purposes of example only, the network element 10 is illustrated as an optical platform in which an optical service channel (OSC) card 62 is installed in slot 12, and a single line amplifier (SLA) card 64 is installed in slot 14. A wavelength selective switch (WSS) card 66, which requires two slots, is installed in slots 16 and 17 (16/17). FIG. 1 and these descriptions relate also more generally to network elements having slots that receive cards.

Installation and validation are typically conducted in the field by an installation technician. A network element 10 and cards are to be initially installed and may require occasional servicing. Validation typically includes confirmation as to whether the cards are installed in slots as assigned by network planners, engineers, etc. Thus, installation data including software and slot assignments needs to reach installation locations. As described herein, the systems and methods are contemplated with respect to network elements, network devices, routers, switches, stand-alone network equipment, and the like. That is, the systems and methods contemplate use with any networking equipment that requires installation and provisioning.

Network elements such as that illustrated in FIG. 1 typically provide the same connectivity to each slot. The trend in network element deployment has been flexibility allowing virtually any card to be housed in any slot. For example, the shelf 18 may support optical, photonic and electrical Ethernet switching. Each slot may provide, for example, a tributary, line, transponder and photonic interfacing, switch, or the like. From a local hardware perspective, the cards 62, 64 and 66 do not typically need to be installed in any particular order along the shelf 18. However, network planners and operators often expect particular cards to be installed in assigned slots to minimize errors when network elements and their cards are installed or maintained. For example, if technicians are sent to replace or service the OSC cards 62 in several network elements 10, errors are avoided if all of the cards are installed in the same assigned slots or in predetermined slots that may differ across the network as long as the slot assignments are recorded in some system.

Figure 2:
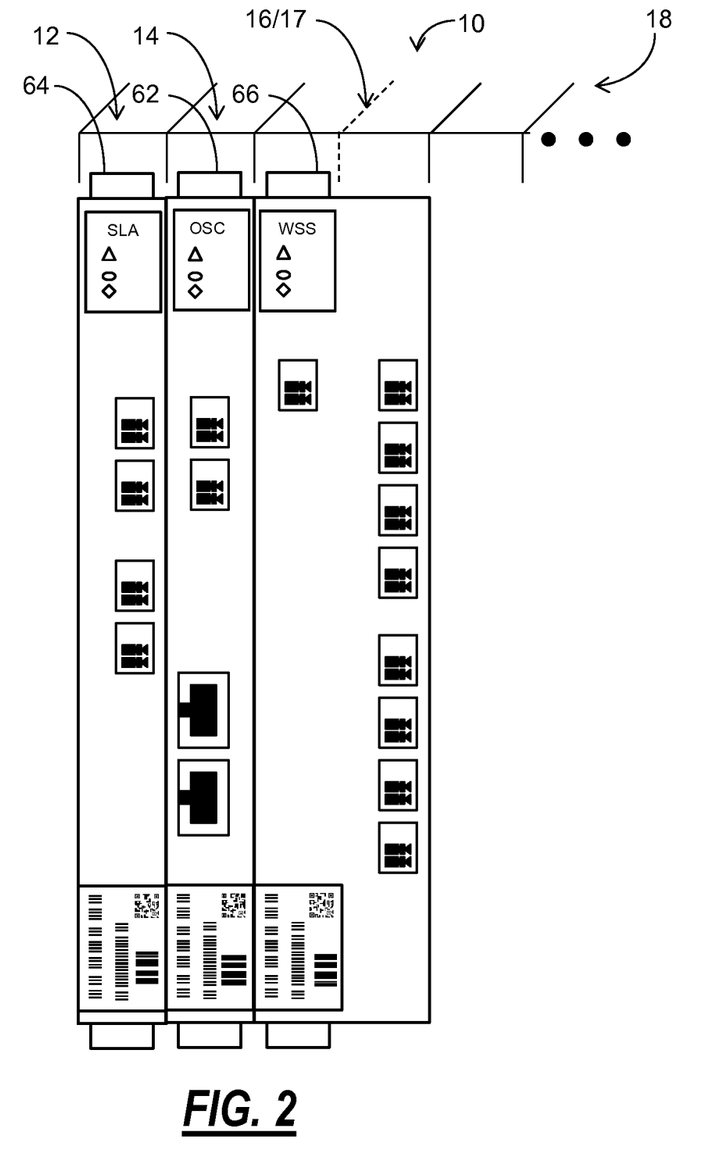
FIG. 2 is a pictorial representation of the cards and network element of FIG. 1 in a different installation arrangement.

Ultimately, due to the any-slot with any-card flexibility, strict adherence to slot assignments at every hardware location across a large network may not be achieved. Installations may be implemented in tight spaces. Mechanical and electrical connectors may fail. Thus, some flexibility may be needed at network element locations. For example, a second installation of the cards 62, 64 and 66 respectively into the slots 14, 12 and 16/17 is represented in FIG. 2, in which the slot positions of the OSC card 62 and SLA card 64 are swapped with respect to FIG. 1. In this example, FIGS. 1 and 2 represent installations that are expected to perform essentially identical roles in a network. In some cases, multiple card arrangements for a shelf will be deemed as valid such that both FIGS. 1 and 2 may represent acceptable installations. In other cases, slot assignments are considered strict such that, for example, FIG. 2 would represent an unacceptable installation.

Installation of the cards in the network element 10, whether as shown in FIG. 1 or FIG. 2, is to be validated before the network element 10 is provisioned for network use. When cards cannot be installed in the slots as assigned or where multiple assignment configurations are acceptable, network maps and records maintained on central servers need to be updated to reflect actual installation configurations. Thus, installation reports need to reach central servers and network planners and operators.

Briefly stated, by various exemplary embodiments described in further detail below, the processes of installing, validating and provisioning network elements and cards are streamlined by a method 200 (FIG. 3) implemented by a mobile-device application running on a mobile device 110 (FIG. 4), such as a smart phone, carried by an installation technician. Optical markers 32, 34 and 36 (FIG. 1), which are illustrated as quick response (QR) codes, are provided on the cards 62, 64 and 66 for optical scan by the mobile device 110.

Figure 4:
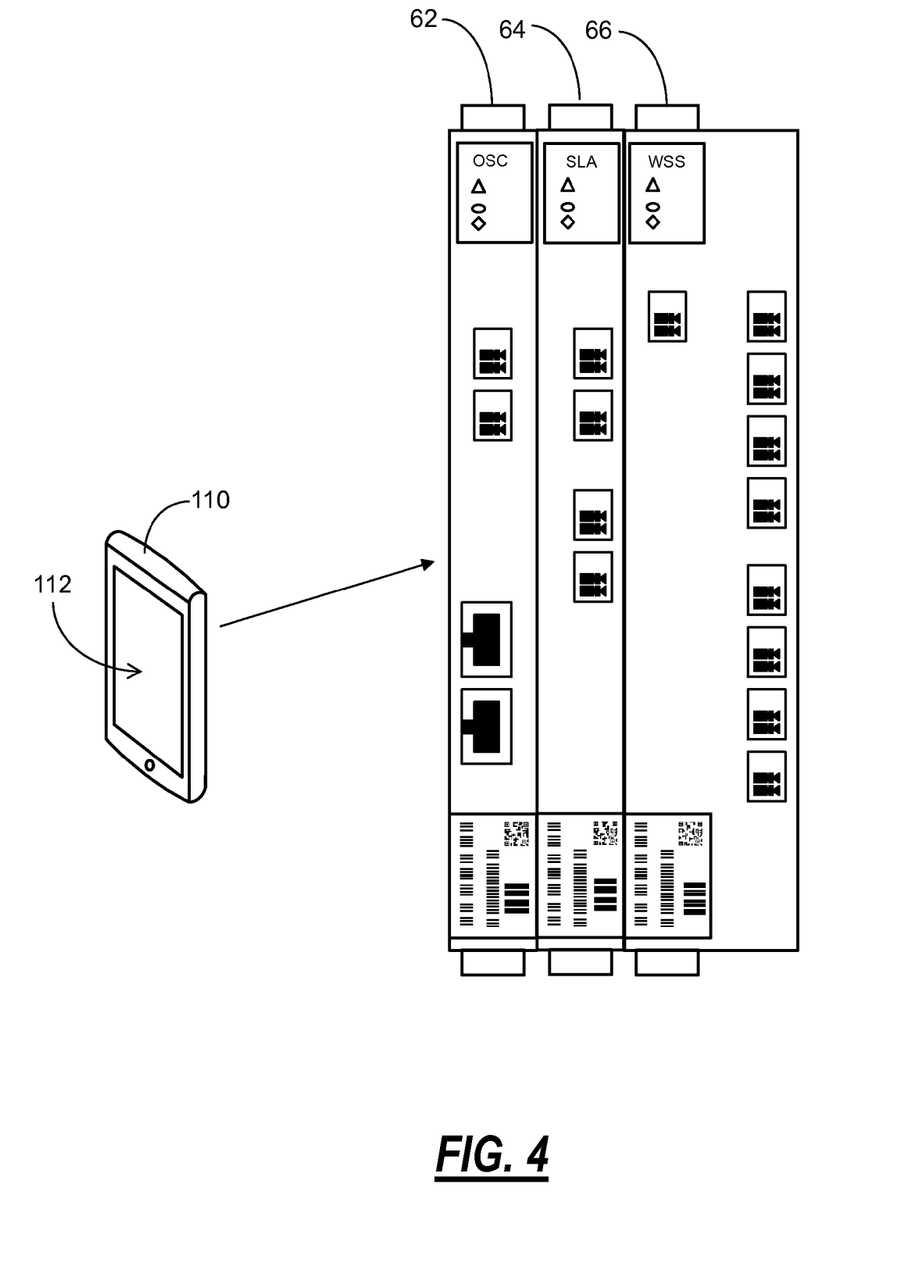
FIG. 4 is a diagrammatic representation of an exemplary mobile device capturing an image of an installation according to one embodiment of the present invention.

As shown in FIG. 4, the mobile device 110 is used to capture an image of the installed cards 62, 64 and 66 and the mobile-device application running on the mobile device recognizes the markers 32, 34 and 36 within the captured image to identify the particular cards installed and to validate their installation with regard to their slot positions in a shelf. A validation indication may be emitted or displayed as a go/no-go signal to indicate that the scanned installation is acceptable. If multiple arrangements of cards are acceptable, for example as shown in FIGS. 1 and 2, a validation indication may further indicate a preference level of the scanned installation. In some embodiments, the mobile device application implements and updates software and other internal configurations of the network element 10 and cards 62, 64 and 66. The mobile device application may furthermore prompt updates of network maps and records to reflect the actual installation.

In at least one embodiment, the mobile device application implements bidirectional communication between the mobile device and central servers, such that installation data is downloaded to the mobile device and installation reports are uploaded from the mobile device based on validating using an optical scan.

Figure 3:
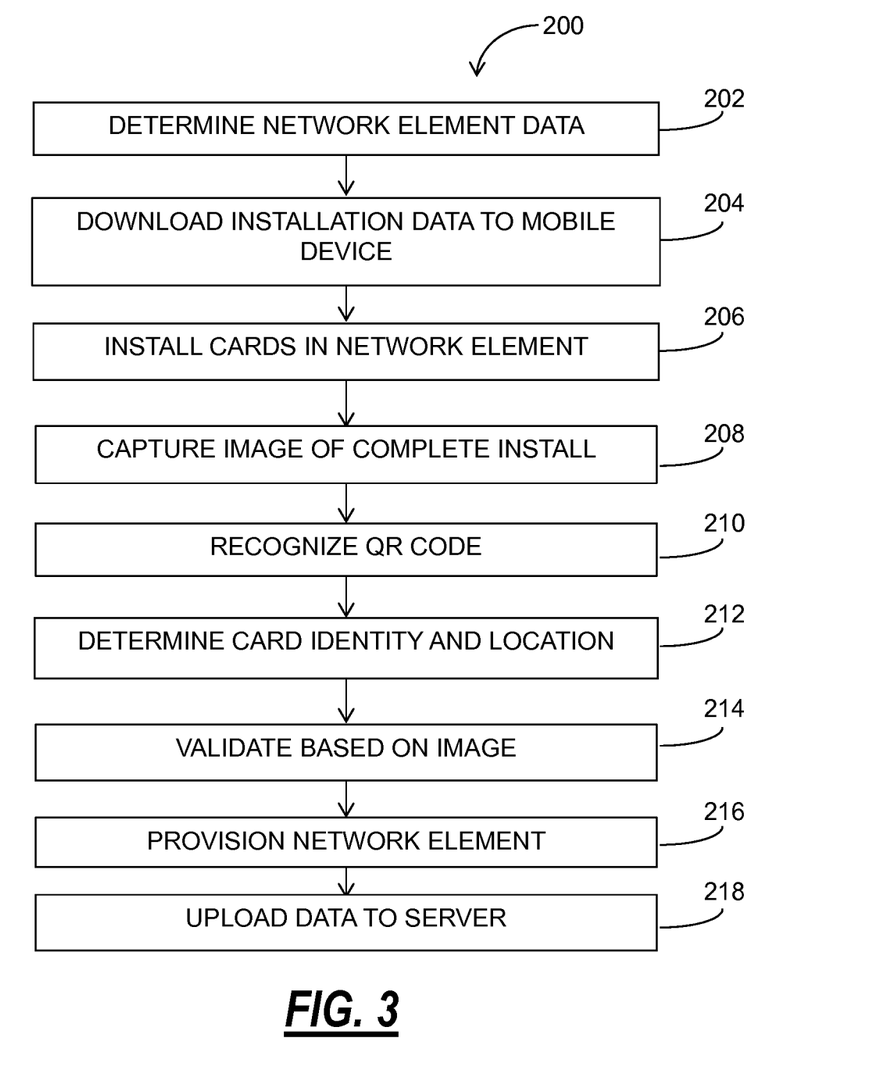
FIG. 3 is a flowchart of a mobile-device implemented method of validating an installation in accordance with at least one embodiment of the present invention.

With reference now to FIG. 3, the method 200 of validating installation of a card within a network element is implemented by a mobile device. As represented by step 202, the particular installation is identified by the determination of network element data that includes, for example, information specifying the network element 10 (FIG. 1) and the cards 62, 64 and 66 that are affected by the installation. In step 204, installation data is downloaded to the mobile device. In some cases, a work order number or other indentifying information is keyed into the mobile device by a technician to prompt the determination of network element data and the downloading of installation data.

For convenience however, a control QR code associated with an installation may be established to trigger the mobile-device application to decode, download, and/or access information so that a particular installation is identified and network element data is determined. In at least one embodiment, a control QR code is scanned to prompt the mobile device to download or access a set of multiple QR codes in certain x,y coordinate layouts or otherwise specifying the correct slot assignments for the installation of multiple cards for a network element at an installation site. For example, a control QR code may be mounted on a work order or on a shelf 18 or platform 10 (FIG. 1) to be scanned and recognized by the mobile-device application. Alternatively, the QR codes 32, 34, 36 (FIG. 1) may have encoded information specifying both the identity and correct installation of the cards 62, 64, 66. Thus, the QR codes 32, 34, 36 may singly or collectively serve as a control QR code.

Figure 5:
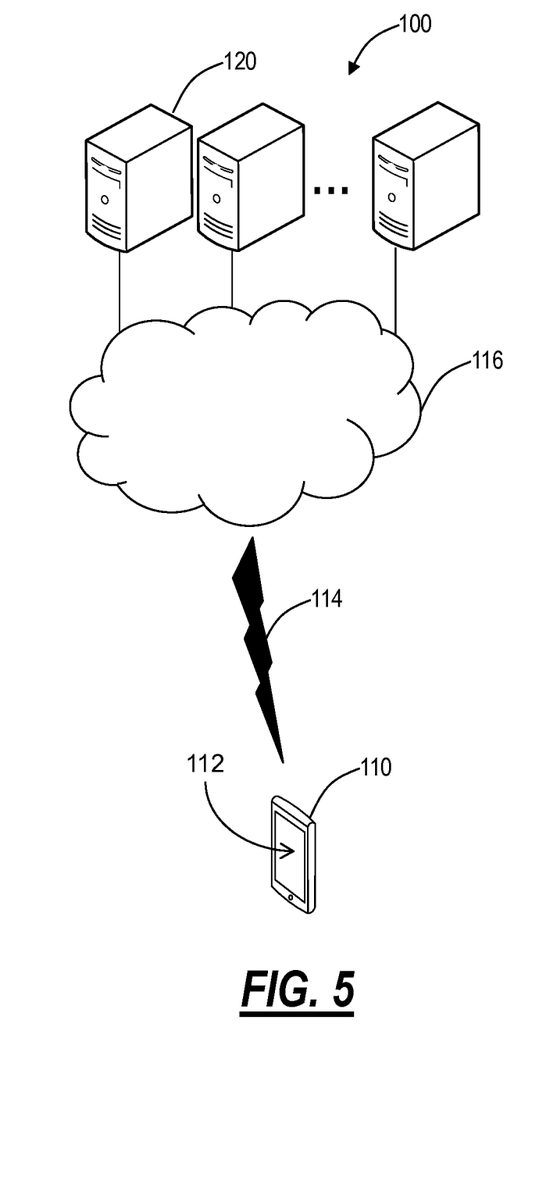
FIG. 5 is a block diagram of an exemplary mobile device in wireless communication with servers via a network.

As installations may occur in remote locations, installation data may be loaded onto the mobile device 110 (FIG. 4) before the technician travels to the installation site. For example, the technician may download the installation data before leaving a central office, while at home, in a hotel, or at an airport while traveling. Where connectivity is available, the installation data may be loaded onto the mobile device 110 upon arrival to the installation site, for example, by wireless internet download. Downloading of installation data from servers 120 to the mobile device 110 through a network 116 and a wireless connection 114 is represented in FIG. 5. The mobile device 110 in other examples can be loaded with installation data through a wired connection such as via a USB port or USB adapter.

Figure 6:
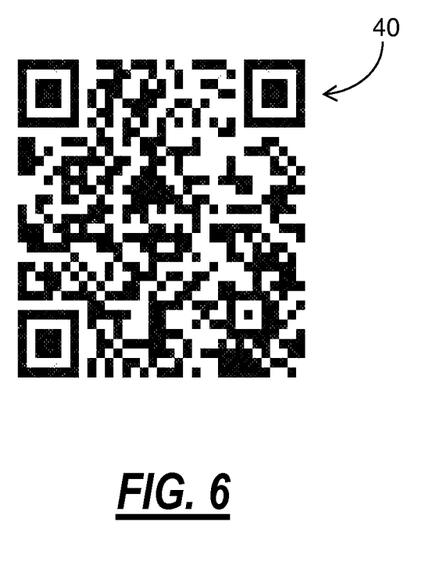
FIG. 6 is an exemplary QR code.

An exemplary QR code 40 is shown in FIG. 6. A QR code is a two dimensional matrix barcode typically having information encoded in the placement of black square matrix elements (dots) on a white background. A QR code, for example, might be permanently or temporarily applied to a card as a sticker or other graphical medium. At least partial installation data regarding the example of FIG. 1 is encoded in the exemplary QR code 40, which is decoded as follows.

(ots:cust_site_1@14@OSC@1@SLA@2@2×1 WSS 100 GHz@3-4:strict)

An Optical Transport System is indicated in the encoded information by "ots." A particular customer installation location is indicated by "cust_site_1." The total number of slots is indicated as "14." The OSC card 62 (FIG. 1) and the SLA card 64 are assigned to the first slot 12 and second slot 14, respectively. The WSS card is assigned to the third and fourth slots 16/17. Strict adherence to slot assignments is indicated in this example. Thus, in this example, the installation shown in FIG. 2 would not be validated due to misplacement of the OSC card 62 and the SLA card 64.

Figure 7:
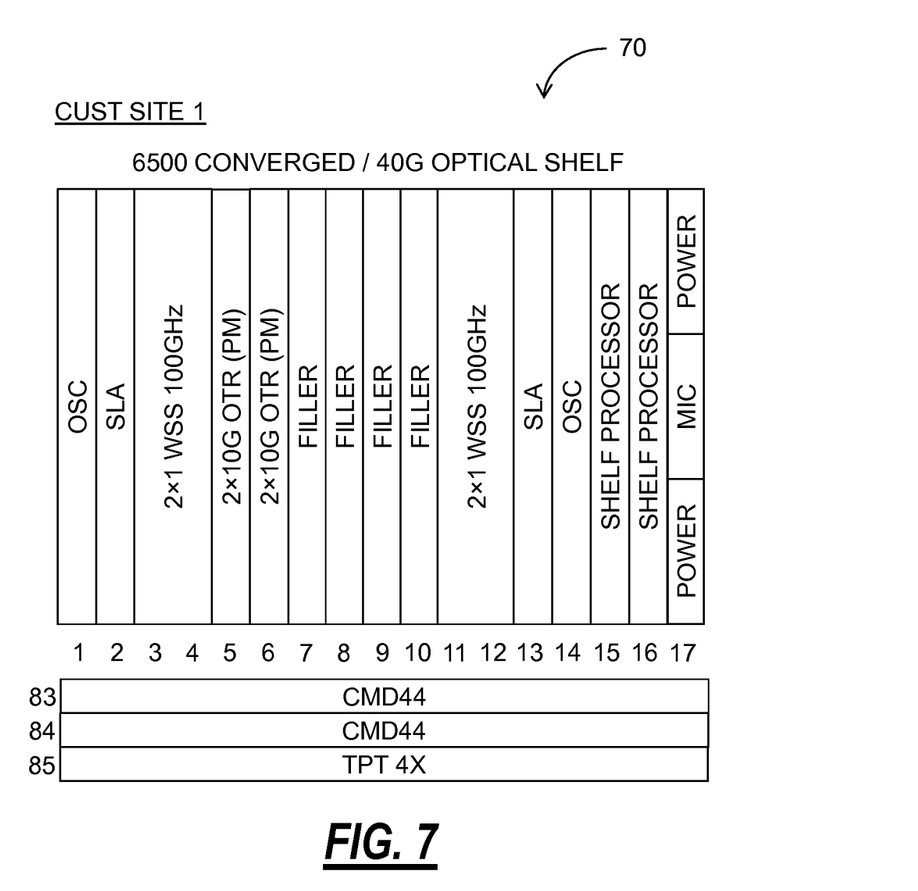
FIG. 7 is template illustrating a correct installation according to slot assignments for a number of cards.

In one example, installation data including equipment assignments for the common/shared group of cards is exported in QR codes (FIG. 6) in addition to computer templates (FIG. 7). The data includes information regarding the dimensions of the platform 10 (FIG. 1), shelf 18, all slots involved in the installation under consideration, and the cards to be installed. The mobile-device platform will use such dimensional data to validate the installation.

Furthermore, in at least one embodiment, a pictorial representation is acquired or generated by the mobile-device application and displayed to the installation technician to guide the installation of the cards. With respect to the current example in which the installation of cards 62, 64, 66 in FIG. 1 requires validation, a pictorial representation 70 in a spreadsheet format of the correct installation according to slot assignments for a number of cards is shown in FIG. 7. Although FIG. 7 shows additional card assignments for additional slots in the shelf, the example described herein with reference to FIG. 1 is expressly directed only to the assignments of cards 62, 64, 66 (FIG. 1) to slots 12, 14, 16/17 respectively. In practice, a pictorial representation displayed by the mobile-device application may provide installation information for any number of cards.

Returning to FIG. 3, in step 206, cards are installed into a network element. For example, a technician installs cards 62, 64, 66 into slots 14, 12 and 16/17 as shown in FIG. 1. The technician may view the pictorial representation 70 (FIG. 7) displayed on the screen 112 of the mobile device 110 (FIG. 4) for guidance.

In step 208 (FIG. 3), the technician uses the mobile device 110 to capture an image of the installation, for example as shown in FIG. 4. By analyzing the captured image, the mobile-device application will determine whether the cards are installed correctly according to slot assignments included in the installation data loaded on the mobile device. With respect to the current example in which the installation of cards 62, 64, 66 in FIG. 1 requires validation, the QR codes 32, 34, 36 are provided to identify and spatially locate their host cards. For example, the QR code 32 has encoded information that identifies the OSC card 62 and the mobile-device application can recognize both the identity and relative location of the card 62 when the QR code is recognized in the captured image. Thus, in step 210, the mobile-device application recognizes one or more QR codes in the captured image.

In step 212 (FIG. 3) upon recognition of the markers 32, 34, 36, the mobile-device application decodes the information encoded on the markers to identify the OSC card 62, SLA card 64, and WSS cards 66. Due to precise placement of the markers 32, 34, 36 on their host cards 62, 64, 66, the locations of the cards with respect to slot positions are determined by the mobile-device application as well. In some cases, a card may have several areas where a marker such as a QR code can be placed. In such cases, the downloaded installation data will indicate several possible such QR code locations for such a card so that the location of the card with regard to slot position can still be confidently determined.

In at least one embodiment, the mobile-device application is run on a global positioning system (GPS) equipped mobile device that verifies the location where installation and validation are to occur. This confirms that an intended installation is conducted at an intended geolocation.

In one embodiment, the mobile-device application provides an alignment graphic, such as an outline, used by the installation technician, for example using the camera resident in the mobile device 112 and the touch screen 110 thereof or other user input. The alignment graphic is used to locate or scale the objects in an image of the shelf undergoing installation in preparation for installation validation. In at least one embodiment, an image representing the shelf and any cards installed thereon is shown on the display screen 112 of the mobile device 110. The image may be a live image or a picture at least tentatively stored by the mobile-device application or mobile device. The installation technician then, viewing the shelf and cards on the display screen by use of the camera resident on the mobile device, overlays the outline onto the displayed image of the shelf and installed cards. When the outline is properly positioned relative to the image, the mobile application performs a scan and determines the location of each installed card relative to the shelf and provides a validation response that indicates whether each card is installed into the correct slot of the shelf.

For example, in FIG. 1, an alignment and scale graphic 20 is provided on the display 112 of the mobile device 110 in which the mobile-device application operates. The alignment and scale graphic 20 appears in the foreground of an image representing the shelf and any cards installed thereon.

Aligning includes moving and orienting the graphic relative to the image until respective features thereof are aligned. In the example illustrated in FIG. 1, aligning includes moving the graphic 20 relative to the overall image until a horizontal axis 22 and a vertical axis 24 of the graphic 20 overlay corresponding features shown in the image. In this example, for alignment to be correct, the vertical axis 24 of the graphic 20 should overlay the left vertical edge of the OSC card 62, and the horizontal axis 22 of the graphic 20 should overlay the aligned lower edges of the OSC card 62, SLA card 64, and WSS card 66.

Scaling includes adjusting the relative size of the graphic 20 until features thereof are sized according to corresponding features of the image. In the example illustrated in FIG. 1, scaling includes resizing the graphic until, for example, calibration markers on the graphic overlay particular respective features of the image. More specifically, calibrations markers 26, 28 are provided respectively at the left and right opposing ends of the horizontal axis 22 of the graphic 20. In this example, for scaling to be correct, the left calibration marker 26 should overlay the left lower corner of the OSC card 62, and the right calibration marker 28 should overlay the right lower corner of the WSS card 66.

Aligning and scaling may be completed in either order at the preference of the user, and may be conducted iteratively with the user alternating between alignment and scaling efforts until both are complete. In one embodiment, aligning and scaling are accomplished as the installation technician touches the touch screen 112 of the mobile device 110. In other embodiments, other user-input devices are used. In one such example, a mouse is used to input click and drag commands, with regard both to linear movements and turning about rotation points. In yet another example, aligning and scaling are done automatically, for example by automatic recognition of calibration points.

In other embodiments, the mobile-device application determines the positions of the installed cards relative to the shelf by recognizing one or more visual identification markers on the shelf or network element in addition to recognizing the markers on the installed cards. For example, in at least one embodiment, a QR code is positioned on a shelf in a set location. In such an example, the location of each installed card is determined relative to the shelf by determination of the location of a QR code on the card relative to the set location of the QR code on the shelf.

In step 214 (FIG. 3), the installation depicted in a captured image is validated. An indication of validation is provided to the installation technician as a visual or audio signal. The indication will confirm whether the scanned installation configuration is correct or an error is detected. In at least one embodiment, the indication is a go/no-go signal indicating only whether the installation is correct or incorrect. In other embodiments, one or more error reports are provided detailing, for example, whether one or more cards are misplaced or not present. In step 216, assuming the installation is validated in step 214, the network element under installation is provisioned. The network element is powered and put into network service.

As described above, both FIGS. 1 and 2 represent alternative installations of the OSC card 62 and SLA card 64. Thus, where such redundancy or flexibility is foreseen, data correlated to multiple correct installations is loaded onto the mobile device 112 with the downloaded installation data in preparation for establishing the network element 10. Multiple acceptable installation configurations may include a one or more preferred configurations, which may be ordered by preference level. In such examples, the validation indication can provide a go/no-go signal indicating whether the scanned installation is one of multiple acceptable installations, and may further indicate a preference level of the scanned installation. However, any given card may be assigned a strict preference with regard to slot assignment. In that example, the card must be recognized as installed in the assigned slot in order for the installation to be validated. With a variable preference, the application in at least one embodiment computes a list of expected positions for the entities and presents them one at a time to the user for overlay within the 2D layout.

In step 218, data is uploaded to central servers from the mobile device. For example, an installation report may be uploaded to indicate and document successful installation. Any slot assignments or other variables of the installation that vary from conditions prescribed by network planners are indicated in uploaded data. Where multiple assignment arrangements are acceptable, the particular assignment arrangement implemented is also indicated.

Thus, by use of the mobile-device application described herein, multiple identification markers on multiple cards are simultaneously recognized and the locations of multiple cards installed within respective slots are automatically determined. Installation mistakes can be identified immediately and operating costs can be reduced by eliminating unnecessary installation fallout or repeated site visits. The mobile-device application can also be used for training purposes. For example, filler cards with QR codes and a shelf, which need not be powered, can be scanned for training purposes.

Figure 8:
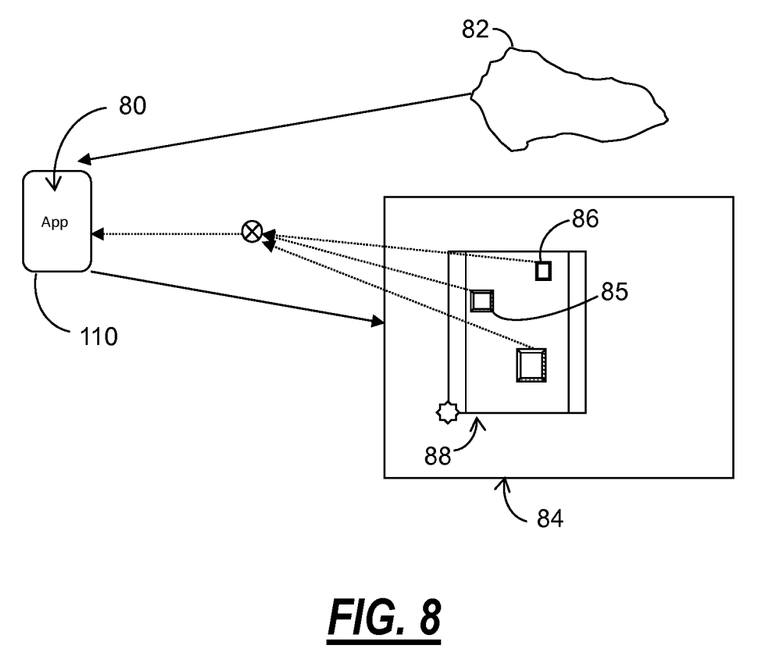
FIG. 8 is a block diagram of a mobile device application that computes expected entity locations based on information embedded in a barcode according to at least one embodiment of the present invention.

For each new type of installation that is to be verified, a planner or other system generates an exemplary actionable barcode encoded with the following information:

application_type:location@container@entity1@
position_marker1@entity2@position_marker-
2@ . . . @preference As represented in FIG. 8, the application 80 decodes the barcode to get the encoded information. The application 80 understands the application type token in the encoded information. The location token allows the application to perform geo-location based verification. The container token provides the application a specification of an area of interest 82. The application 80 can capture the area and project it as a two dimensional layout 84. The entities are expected to be positioned within this layout. The application uses entity1, entity2 and the corresponding position_marker1 (85) and position_marker2 (86), and so forth for any additional entities, to compute an overlay 88 inside the 2D layout 84. The application also computes the expected locations within the overlay 88 where entity specific barcodes are expected to be positioned according to strict preference. When the user requests the go/no-go validation, the application captures the barcodes and performs validation as per preference.

Figure 9:
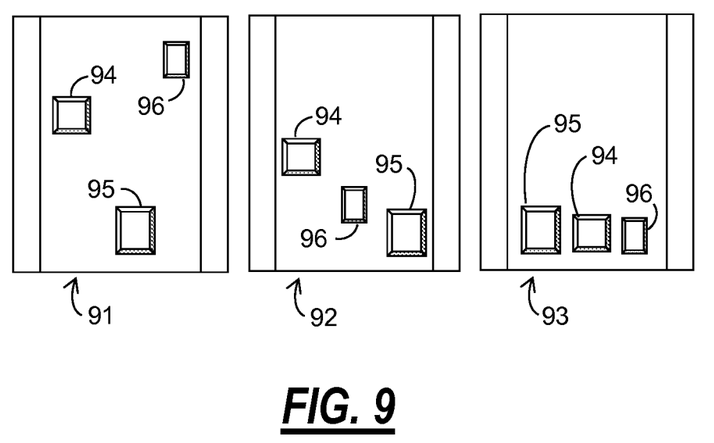
FIG. 9 is a diagrammatic representation of alternative layouts for several expected entities.

The preference allows for variability of expected positions within the overlay. When a strict preference is specified, the barcodes must be in the expected positions. With a variable preference, the application computes a list of expected positions for the entities and presents them one at a time to the user for overlay within the 2D layout as represented in FIG. 9. In first layout 91, entities 94, 95 and 96 are shown in one expected position configuration. In the second and third layouts 92 and 93, alternative layouts are represented. In these examples, the horizontal position of an entity represents a slot assignment for a card, and vertical position represents the placement of a QR code on the card.

Returning to FIG. 5, in an exemplary embodiment, a block diagram illustrates a data stream system 100 in a wireless network. In particular, the system 100 includes the mobile device 110 with a wireless connection 114 to a network 116. For example, the mobile device 110 can include a digital cellular phone, a smart phone, a personal digital assistant, a tablet device, an ultra book, a net book, a laptop, a mobile data terminal, a desktop with a wireless interface, or the like. The system 100 further includes one or more servers 120 which are communicatively coupled to the network 116. In an exemplary embodiment, the network 116 can include the Internet, Virtual Private Networks (VPNs), Local Area Networks (LANs), wireless provider networks (e.g., 3G, 4G, etc.), Wireless LAN (WiFi), and combinations thereof. That is, the mobile device 110 can connect to a wireless network which is communicatively coupled to a private or public IP network (such as Internet). The servers 120 can connect to a LAN which is communicatively coupled to the network (such as Internet). In FIG. 5, these various networks are singularly illustrated by the network 116 for illustration purposes. The servers 120 can be network planning servers, network management systems, inventory management systems and the like. In FIG. 5, a wireless connection 114 is shown as an example. The mobile device 110 in other examples has one or more ports, such as USB ports, for wired connections. In one example, a USB adapter is provided for use with a mobile device that lacks an on-board USB port.

Figure 10:
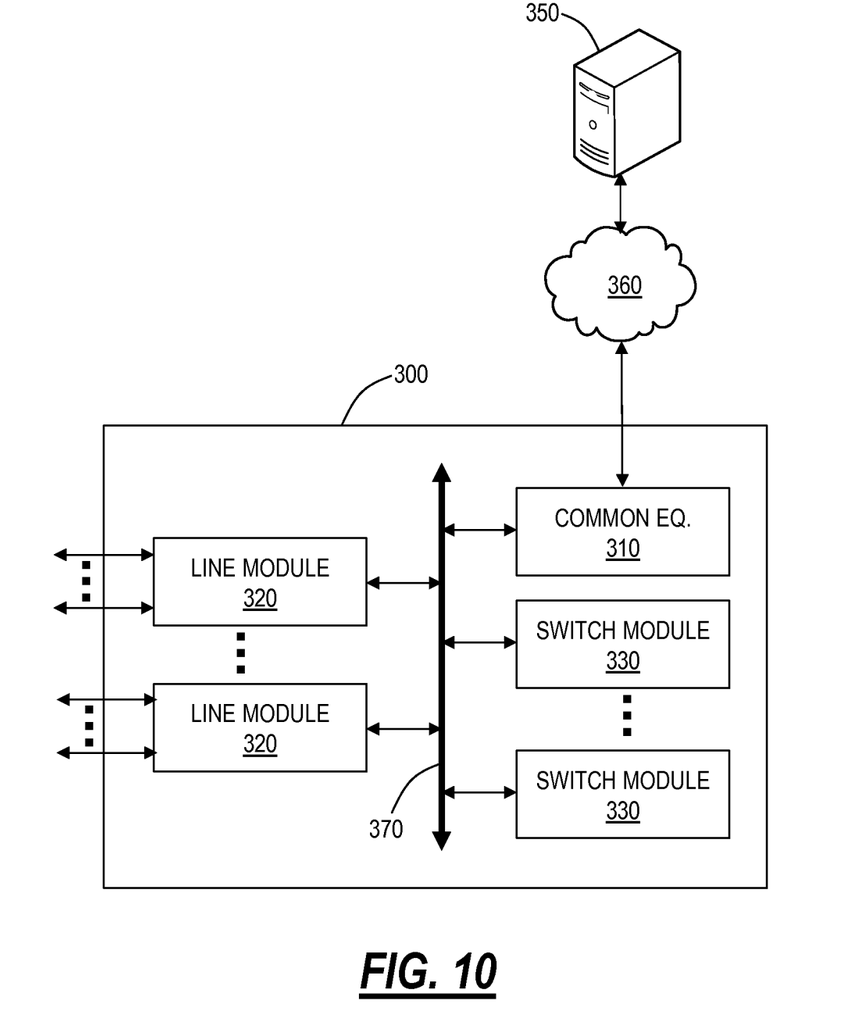
FIG. 10 is a block diagram of an exemplary implementation of a network element.

It will be appreciated that some exemplary embodiments described herein may include one or more network elements. Referring to FIG. 10, in an exemplary embodiment, a block diagram illustrates an exemplary network element 300, which may diagrammatically represent the network element 10 of FIG. 1. In an exemplary embodiment, the exemplary network element 300 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 300 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 300 can be any digital system with ingress and egress digital signals and switching therebetween of channels, timeslots, tributary units, etc. utilizing OTN, SONET, SDH, etc. While the network element 300 is generally shown as an optical network element, the systems and methods contemplated for use with any switching fabric, network element, or network based thereon.

In an exemplary embodiment, the network element 300 includes common equipment 310, one or more line modules 320, and one or more switch modules 330. The common equipment 310 can include power; a control module; operations, administration, maintenance, and provisioning (OAM&P) access; user interface ports; and the like. The common equipment 310 can connect to a management system 350 through a data communication network 360. The management system 350 can include a network management system (NMS), element management system (EMS), or the like. Additionally, the common equipment 310 can include a control plane processor configured to operate a control plane as described herein. The network element 300 can include an interface 370 for communicatively coupling the common equipment 310, the line modules 320, and the switch modules 330 therebetween. For example, the interface 370 can be a backplane, mid-plane, a bus, optical or electrical connectors, or the like. The line modules 320 are configured to provide ingress and egress to the switch modules 330 and external to the network element 300. In an exemplary embodiment, the line modules 320 can form ingress and egress switches with the switch modules 330 as center stage switches for a three-stage switch, e.g. a three stage Clos switch. Other configurations and/or architectures are also contemplated. The line modules 320 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 320 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 320 can include wavelength division multiplexing interfaces, short reach interfaces, and the like, and can connect to other line modules 320 on remote network elements, end clients, edge routers, and the like. From a logical perspective, the line modules 320 provide ingress and egress ports to the network element 300, and each line module 320 can include one or more physical ports. The switch modules 330 are configured to switch channels, timeslots, tributary units, etc. between the line modules 320. For example, the switch modules 330 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc. In an exemplary embodiment, the switch modules 330 provide OTN, SONET, or SDH switching.

Those of ordinary skill in the art will recognize the network element 300 can include other components which are omitted for illustration purposes, and that the systems and methods described herein are contemplated for use with a plurality of different network elements with the network element 300 presented as an exemplary type of network element. For example, in another exemplary embodiment, the network element 300 may not include the switch modules 330, but rather have the corresponding functionality in the line modules 320 (or some equivalent) in a distributed fashion. For the network element 300, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, etc. The network element 300 is illustrated herein as a mere example of a network element for use with the systems and methods described herein. Those of ordinary skill in the art will appreciate the systems and methods described herein are equally applicable to any telecommunication or data communication etc. type of network element.

Figure 11:
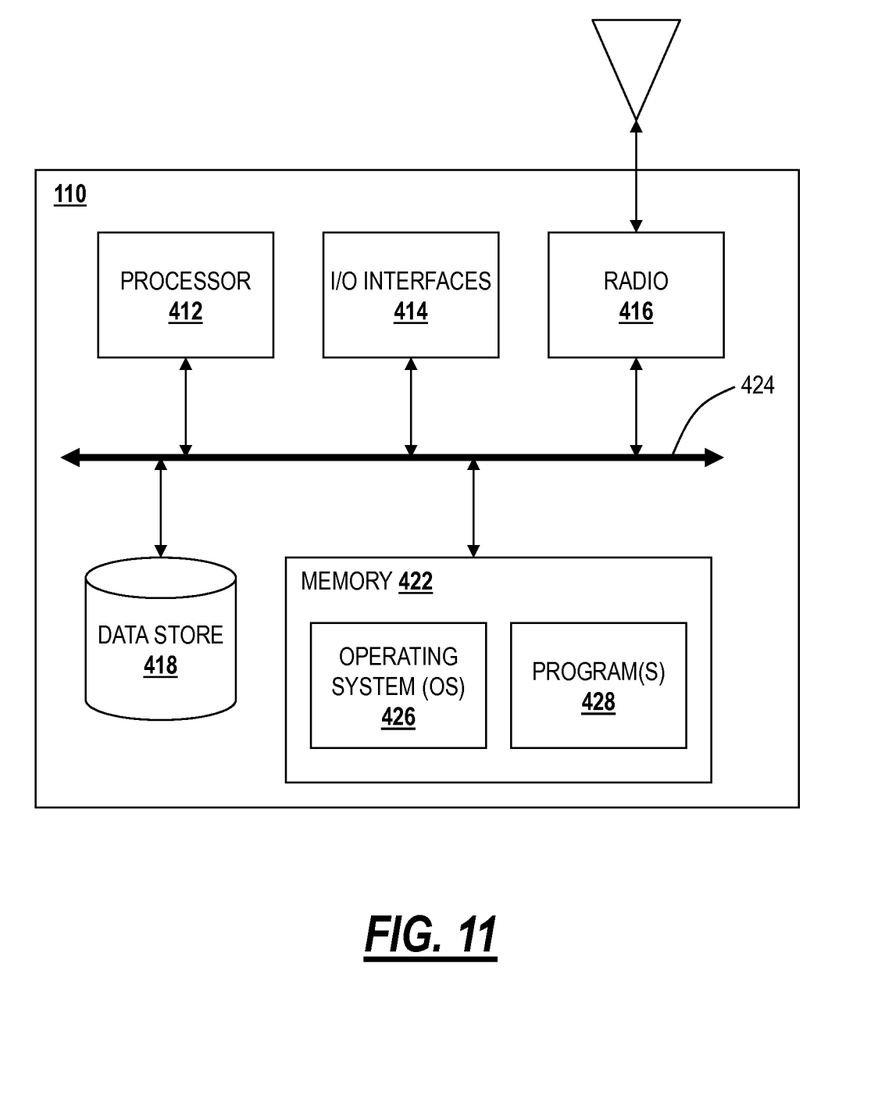
FIG. 11 is a block diagram of an exemplary mobile device for use in accordance with some embodiments of the invention.

The mobile device application will run on a computing device, preferably a mobile client device 110 as represented in FIG. 11. In an exemplary embodiment, a block diagram illustrates the client device 110 for use in the system 100 (FIG. 5) and the various embodiments of the method 200 (FIG. 3). The client device 110 can be a digital device that, in terms of hardware architecture, generally includes a processor 412, input/output (I/O) interfaces 414 including the touch screen 112 (FIG. 4) and camera, a radio 416, a data store 418, and memory 422. It should be appreciated by those of ordinary skill in the art that FIG. 9 depicts the client device 110 in an oversimplified manner, and a practical embodiment can include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components The processor 412 is a hardware device for executing software instructions. The processor 412 can be any custom made or commercially available processor, a central processing unit (CPU), an auxiliary processor among several processors associated with the client device 110, a semiconductor-based microprocessor (in the form of a microchip or chip set), or generally any device for executing software instructions. When the client device 110 is in operation, the processor 412 is configured to execute software stored within the memory 422, to communicate data to and from the memory 422, and to generally control operations of the client device 110 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the client device 110. Additionally, the I/O interfaces 414 may further include one or more further imaging devices, i.e. additional camera, video camera, etc.

The radio 416 enables wireless communication to an external access device or network. Any number of suitable wireless data communication protocols, techniques, or methodologies can be supported by the radio 416, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 can be used to store data. The data store 418 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 can incorporate electronic, magnetic, optical, and/or other types of storage media.

The memory 422 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 422 may incorporate electronic, magnetic, optical, and/or other types of storage media. Note that the memory 422 can have a distributed architecture, where various components are situated remotely from one another, but can be accessed by the processor 412. The software in memory 422 can include one or more software programs, each of which includes an ordered listing of executable instructions for implementing logical functions. In the example of FIG. 11, the software in the memory system 422 includes a suitable operating system (O/S) 426 and programs 428. The operating system 426 essentially controls the execution of other computer programs, and provides scheduling, input-output control, file and data management, memory management, and communication control and related services. The programs 428 can include various applications, add-ons, etc. configured to provide end user functionality with the client device 110. For example, exemplary programs 428 can include, but not limited to, a web browser, social networking applications, streaming media applications, games, mapping and location applications, electronic mail applications, financial applications, and the like. The programs 428 can include one or more applications and/or executable instructions to perform the various methods described herein.

Finally, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A mobile-device implemented method of validating installation of a network device, the method comprising:
    capturing an image showing at least one card installed in a network device, the card having a marker thereon;
    recognizing the marker within the captured image and identifying the card by association with the recognized marker;
    determining a physical position of the card in the network device according to the captured image; and
    obtaining a validation of the determined physical position.
2. The mobile-device implemented method of claim 1, wherein the network device comprises a shelf with multiple slots and the at least one card is installed in a particular slot.

3. The mobile-device implemented method of claim 2, wherein determining the physical position of the card in the network device comprises determining the particular slot.

4. The mobile-device implemented method of claim 1, wherein the marker comprises a quick response (QR) code.

5. The mobile-device implemented method of claim 1, further comprising loading installation data related to the installation of the network device onto the mobile device.

6. The mobile-device implemented method of claim 1, further comprising loading installation data related to the installation of the network device onto the mobile device when prompted by the recognition of at least one QR code in at least one image captured by the mobile device.

7. The mobile-device implemented method of claim 6, wherein the installation data comprises at least one expected card identity and at least one expected card position.

8. The mobile-device implemented method of claim 1, further comprising sending information identifying the determined physical location from the mobile device to a central server.

9. A system comprising:
a network device having multiple slots;
a card inserted into a particular slot of the multiple slots, the card having a marker disposed thereon; and
a mobile device comprising a non-transitory memory storing instructions which, when executed by the mobile device, cause the mobile device to:
capture an image;
recognize the marker within the captured image;
determine the physical position of the card relative to the network device according to the captured image; and
obtain a validation of the determined physical position.

10. The system of claim 9, wherein the instructions, when executed by the mobile device, cause the mobile device to determine the particular slot in which the card is inserted.

11. The system of claim 9, wherein the marker comprises a quick response (QR) code.

12. The system of claim 9, wherein the instructions, when executed by the mobile device, cause the mobile device to download onto the mobile device installation data related to validating the determined physical position.

13. The system of claim 9, wherein the instructions, when executed by the mobile device, cause the mobile device to download installation data related to installation of the network device when prompted by the recognition of at least one QR code in at least one image captured by the mobile device.

14. The system of claim 13, wherein the installation data comprises at least one expected card identity and at least one expected card position.

15. The system of claim 9, wherein the instructions, when executed by the mobile device, cause the mobile device to send information identifying the determined physical position from the mobile device to a central server.

16. A non-transitory memory storing instructions which, when executed by a mobile device, cause the mobile device to:
capture an image in which at least one card is installed in a network device, the card having a marker thereon;
recognize the marker within the captured image;
determine a physical position of the card relative to the network device according to the captured image and the marker; and
obtain a validation of the determined physical position.

17. The non-transitory memory of claim 16, wherein the network device comprises a shelf with multiple slots and the at least one card is installed in a particular slot.

18. The non-transitory memory of claim 17, wherein the instructions, when executed by a mobile device, cause the mobile device to determine the particular slot.

19. The non-transitory memory of claim 16, wherein the marker comprises a quick response (QR) code.

20. The non-transitory memory of claim 16, wherein the instructions, when executed by a mobile device, cause the mobile device to download installation data related to installation of the network device when prompted by recognition of at least one QR code in at least one image captured by the mobile device.

21. A mobile device comprising:
a non-transitory memory storing instructions which, when executed by the mobile device, cause the mobile device to:
capture an image of a card inserted into a particular slot of the multiple slots of a network device, the card having a marker disposed thereon, and recognize the marker within the captured image;
determine the physical position of the card relative to the network device according to the captured image; and
obtain a validation of the determined physical position.

22. The mobile device of claim 21, wherein the instructions, when executed by the mobile device, cause the mobile device to determine the particular slot in which the card is inserted.

23. The mobile device of claim 21, wherein the marker comprises a quick response (QR) code.

24. The mobile device of claim 21, wherein the instructions, when executed by the mobile device, cause the mobile device to download onto the mobile device installation data related to the validation of the determined physical position.

25. The mobile device of claim 21, wherein the instructions, when executed by the mobile device, cause the mobile device to download installation data related to installation of the network device when prompted by the recognition of at least one QR code in at least one image captured by the mobile device.

26. The mobile device of claim 25, wherein the installation data comprises at least one expected card identity and at least one expected card position.

27. The mobile device of claim 21, wherein the instructions, when executed by the mobile device, cause the mobile device to send information identifying the determined physical position from the mobile device to a central server.

* * * * *